US010826578B2

(12) United States Patent
Nammi et al.

(10) Patent No.: US 10,826,578 B2
(45) Date of Patent: *Nov. 3, 2020

(54) FACILITATION OF BEAMFORMING GAINS FOR FRONTHAUL LINKS FOR 5G OR OTHER NEXT GENERATION NETWORK

(71) Applicant: AT&T Intellectual Property I, L.P., Atlanta, GA (US)

(72) Inventors: SaiRamesh Nammi, Austin, TX (US); Arunabha Ghosh, Austin, TX (US); Milap Majmundar, Austin, TX (US); Aditya Chopra, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/575,897

(22) Filed: Sep. 19, 2019

(65) Prior Publication Data
US 2020/0052746 A1   Feb. 13, 2020

Related U.S. Application Data

(63) Continuation of application No. 16/059,642, filed on Aug. 9, 2018, now Pat. No. 10,461,821.

(51) Int. Cl.
*H04B 7/02* (2018.01)
*H04B 7/0456* (2017.01)
*H04B 7/06* (2006.01)

(52) U.S. Cl.
CPC ......... *H04B 7/0456* (2013.01); *H04B 7/0617* (2013.01); *H04B 7/0626* (2013.01); *H04B 7/0634* (2013.01)

(58) Field of Classification Search
CPC .. H04B 7/0456; H04B 7/0617; H04B 7/0634; H04B 7/0626
(Continued)

(56) References Cited

U.S. PATENT DOCUMENTS 8,750,358 B2   6/2014   Yue et al.
8,934,565 B2   1/2015   Kotecha et al.
(Continued)

FOREIGN PATENT DOCUMENTS

CN   104579443 A   4/2015
KR   10-1382420 B1   4/2014
(Continued)

OTHER PUBLICATIONS

Non-Final Office Action received for U.S. Appl. No. 16/059,642 dated May 9, 2019, 18 pages.
(Continued)

*Primary Examiner* — Don N Vo
(74) *Attorney, Agent, or Firm* — Amin, Turocy & Watson LLP

(57) ABSTRACT

Precoder weights can be indicated to a carrier unit to increase network efficiency. To indicate precoder weights to the carrier unit, various types of precoding data can be used to schedule user equipment. For example, a baseband unit can compress precoding coefficients for channel state information reference signals for a remote radio unit and for a demodulation reference signal (DMRS) to reduce a signaling cost between the remote radio unit and the baseband unit. Because both the baseband unit and the remote radio unit can have access to the basis vectors the basis vectors can be multiplied by coefficients to transmit the compressed weight of the basis vectors. Thus, allowing the remote radio unit to reconstruct the basis vector for the channel state information reference signals.

20 Claims, 14 Drawing Sheets

(58) Field of Classification Search
USPC .................................................. 375/262, 267
See application file for complete search history.

(56) References Cited

U.S. PATENT DOCUMENTS

| | | | |
|---|---|---|---|
| 9,048,909 | B2 | 6/2015 | Zhang et al. |
| 9,590,707 | B1 | 3/2017 | Baik et al. |
| 9,647,736 | B1 | 5/2017 | Schelstraete |
| 9,838,227 | B2 | 5/2017 | Sahin et al. |
| 9,787,379 | B2 | 10/2017 | Onggosanusi et al. |
| 9,973,249 | B2 | 5/2018 | Onggosanusi et al. |
| 2012/0039172 | A1 | 2/2012 | Kim et al. |
| 2018/0212711 | A1 | 7/2018 | Zhu et al. |
| 2018/0310244 | A1 | 10/2018 | Wich et al. |
| 2019/0074885 | A1 | 3/2019 | Chen et al. |
| 2020/0021343 | A1* | 1/2020 | Liu ................... H04B 7/0417 |
| 2020/0029229 | A1* | 1/2020 | Harada ................ H04W 16/28 |
| 2020/0044801 | A1* | 2/2020 | Wang .................. H04W 76/27 |
| 2020/0067581 | A1* | 2/2020 | Osawa ................ H04B 7/0617 |

FOREIGN PATENT DOCUMENTS

| | | |
|---|---|---|
| KR | 10-1803030 B1 | 12/2017 |
| WO | 2014/092034 A1 | 6/2014 |
| WO | 2014/198068 A1 | 12/2014 |
| WO | 2016/007757 A1 | 1/2016 |
| WO | 2017/004546 A1 | 1/2017 |
| WO | 2017/040002 A1 | 3/2017 |
| WO | 2017/142551 A1 | 8/2017 |
| WO | 2017/162143 A1 | 9/2017 |
| WO | 2017/180485 A1 | 10/2017 |
| WO | 2018/058600 A1 | 4/2018 |
| WO | 2018/095526 A1 | 5/2018 |

OTHER PUBLICATIONS

Kang, Jinkyu, et al. "Layered Downlink Precoding for C-RAN Systems with Full Dimensional MIMO." arXiv:1511.08084v1 [cs.IT] Nov. 25, 2015. 29 pages.

Kang, Jinkyu, et al. "Fronthaul Compression and Precoding Design for C-RANs over Ergodic Fading Channels." arXiv:1412.7713v1 [cs.IT] Dec. 21, 2014. 25 pages.

Park, Jihong, et al. "Hybrid Precoding for Massive MIMO Systems in Cloud RAN Architecture with Capacity-Limited Fronthauls." arXiv:1709.07963v1 [cs.IT] Sep. 22, 2017. 13 pages.

Peng, Mugen, et al. "Fronthaui-Constrained Cloud Radio Access Networks: Insights and Challenges." arXiv:1503.01187v1 [cs.IT] Mar. 4, 2015. 22 pages.

Zhou, et al. "Fronthaul Compression and Transmit Beamforming Optimization for Multi-Antenna Uplink G-RAN." IEEE Transactions on Signal Processing, 2016. 14 pages.

* cited by examiner

US 10,826,578 B2

FACILITATION OF BEAMFORMING GAINS FOR FRONTHAUL LINKS FOR 5G OR OTHER NEXT GENERATION NETWORK

CROSS-REFERENCE TO RELATED APPLICATIONS

This application is a continuation of, and claims the priority of, U.S. patent application Ser. No. 16/059,642 (now U.S. Pat. No. 10,461,821), filed Aug. 9, 2018, and entitled "FACILITATION OF BEAMFORMING GAINS FOR FRONTHAUL LINKS FOR 5G OR OTHER NEXT GENERATION NETWORK," the entirety of which is expressly incorporated herein by reference.

TECHNICAL FIELD

This disclosure relates generally to facilitating beamforming gains for fronthaul links. For example, this disclosure relates to facilitating beamforming gains for fronthaul links in a cloud radio access network for a 5G, or other next generation network, air interface.

BACKGROUND

5th generation (5G) wireless systems represent a next major phase of mobile telecommunications standards beyond the current telecommunications standards of 4$^{th}$ generation (4G). Rather than faster peak Internet connection speeds, 5G planning aims at higher capacity than current 4G, allowing a higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption, and lower latency than 4G equipment.

The above-described background relating to facilitating beamforming gains for fronthaul links is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
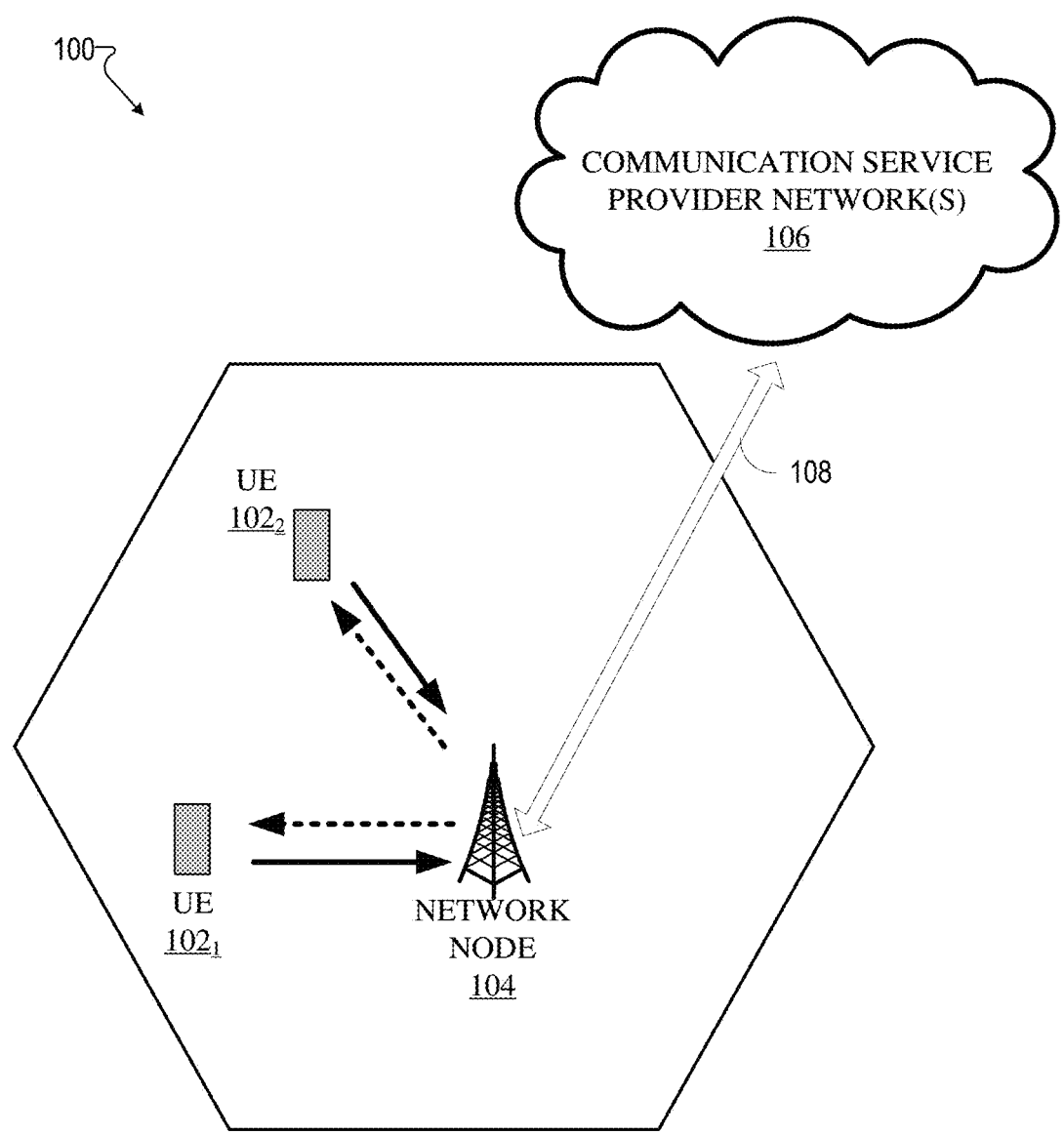
FIG. 1 illustrates an example wireless communication system in which a network node device (e.g., network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate beamforming gains for fronthaul links for a 5G air interface or other next generation networks. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate beamforming gains for fronthaul links for a 5G network. Facilitating beamforming gains for fronthaul links for a 5G network can be implemented in connection with any type of device with a connection to the communications network (e.g., a mobile handset, a computer, a handheld device, etc.) any Internet of things (IOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception.

In some embodiments the non-limiting term radio network node or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

To meet the huge demand for data centric applications, 4G standards can be applied 5G, also called new radio (NR) access. 5G networks can comprise the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

Downlink reference signals are predefined signals occupying specific resource elements within a downlink time—frequency grid. There are several types of downlink reference signals that can be transmitted in different ways and used for different purposes by a receiving terminal. Channel state information reference signals (CSI-RS) can be used by terminals to acquire channel-state information (CSI) and beam specific information (e.g., beam reference signal received power). In 5G, CSI-RS can be user equipment (UE) specific so it can have a significantly lower time/frequency density. Demodulation reference signals (DM-RS), also sometimes referred to as UE-specific reference signals, can be used by terminals for channel estimation of data channels. The label "UE-specific" relates to each demodulation reference signal being intended for channel estimation by a single terminal. The demodulation reference signal can then be transmitted within the resource blocks assigned for data traffic channel transmission to that terminal. Other than the aforementioned reference signals, there are other reference signals, namely multi-cast broadcast single frequency network (MBSFN) and positioning reference signals that can be used for various purposes.

One of the challenges of cloud radio access network (C-RAN) operations is the transmission burden over the fronthaul links. To meet a low-latency requirement, optical fibers can be used as the transmission media between a digital unit (DU) and a radio unit (RU). Due to the increasing bandwidth and the application of massive MIMO for 5G systems, the data rate on fronthaul links can increase. For example, the case of a 400 MHz NR system with 8 CSI-RS ports can be up to 27.2 Gbps. In addition, the data rate can expand to 100s of Gbps with carrier aggregation, which means that a large number of optical fibers can be needed for network construction.

However, the precoding or beamforming can be performed at the RU and the precoder coefficients can be dictated by DU. Since the precoding operation can be performed at the resource block (RB) level/resource element (RE) level, the number of coefficients sent over the fiber link can increase with bandwidth. This, in turn, can increase the overhead of the fiber link in addition to the data.

Compression techniques can be used to reduce the overhead in the fronthaul link at the DU. However, the UE can report the channel state information based on the reference signals transmitted from the RU. The UE can report the CSI based on the CSI-RS transmitted from the RU, which is based on the compressed precoding. While the data transmission can be based on the DM-RS based on the precoding at the DU, there can be a mismatch between the CSI reported by the UE and the channel quality during the data transmission. This can reduce the throughput of the C-RAN systems. Hence, an efficient solution can minimize the loss due to the channel mismatch between and during the channel sounding and data transmission.

The precoding matrix can be transmitted in the front haul C-RAN systems from DU to RU during the channel state information reference signal transmission and during data transmission. The DU can compute the precoder matrix from the estimated channel from the uplink. Once it computes the channel it can determine the coefficients for the linear combination, the basis vectors which are known at the DU, as well as at RU for the CSI-RS transmission. However, it can utilize a different number of coefficients for data traffic transmission. Once it computes the coefficients it can transmit the coefficients using compression techniques. Once the RU receives the compressed coefficients, it can reconstruct the precoder matrix and apply the reconstructed precoder matrix to the CSI-RS and data traffic. For example, the DU can compute the precoder matrix from the estimated channel matrix, compress the information related to precoder coefficients for the CSI-RS transmission, and compress the information related to precoder coefficients for the data traffic channel transmission. The RU can then reconstruct the precoder matrix from the information received from the DU for CSI-RS transmission and for data traffic channels. The generalized system equation is given by:

$$Y = HP3P2P1x + n \qquad \text{Equation (1):}$$

Assuming that the complete channel knowledge is available at the transmitter, this can be done using a sounding reference signal or other means. For the ideal performance, a generalized system equation is given by equation (2):

$$Y = UDV'Px + n, \qquad \text{Equation (2)}$$

Where H is represented as the SVD and P is the combination of P3P2P1. The capacity can be achieved if the precoder matrix P is equal to V. For simplicity, assume P1 and P3 is a unit vector.

Even though the SVD representation is optimal, the representation of P2 can be minimized based on port mapping. For example, if each CSI-RS port is mapped only on all the co-polarized elements of a column, P2 can be written as:

$$P2 = \begin{bmatrix} P2_1 & \Phi & \cdots & \Phi \\ \Phi & P2_2 & \cdots & \Phi \\ \vdots & \vdots & \ddots & \vdots \\ \Phi & \Phi & \cdots & P2_8 \end{bmatrix}, \qquad \text{Equation (3)}$$

where $\Phi$ is given a zero vector of size (8×1) and $P2_k$ is a (8×1) vector containing the mapping of the kth CSI0RS port on the 8 TxRU the kth port is mapped on to.

Thus, the channel matrix can be written as:

$$H = [h_1 h_2 \ldots h_8], \qquad \text{Equation (4)}$$

where the $h_k$ is an nx8 MIMO channel across the TxRUs of the kth CSI-RS port. Now we create a partial covariance matrix of the MIMO channel H as:

$$\Psi_{partial} = \begin{bmatrix} \Psi_1 & \Phi & \cdots & \Phi \\ \Phi & \Psi_2 & \cdots & \Phi \\ \vdots & \vdots & \ddots & \vdots \\ \Phi & \Phi & \cdots & \Psi_8 \end{bmatrix} = \begin{bmatrix} h_1^H h_1 & \Phi & \cdots & \Phi \\ \Phi & h_2^H h_2 & \cdots & \Phi \\ \vdots & \vdots & \ddots & \vdots \\ \Phi & \Phi & \cdots & h_8^H h_8 \end{bmatrix}, \qquad \text{Equation (5)}$$

where $\Phi$ now represents an 8×8 zero matrix.

From Equation (5) one can deduce that the channel covariance within the TxRU of a given CSI-RS port k is given by $\psi_{hd\_k}$. Therefore, the optimum precoder $P2_k$ for the kth CSI-RS port can be given by the dominant Eigen vector of $\psi_k$ as shown in Equation (6).

$$\psi_k = Q_k \Lambda_k Q_k^{-1}$$

$$P2_k = Q_k(1) \qquad \text{Equation (6)}$$

Hence, the main principle is to compute the SVD for each column and formulate the beamforming matrix. This can facilitate the beam space representation and compression such that the representation can reduce the signaling overhead from DU to RU.

The basis vectors can be defined as DFT vectors which are known to the DU and RU. In one embodiment, the DU and RU know the basis vectors a priori. In another embodiment, the DU can periodically or for the first time transmit the basis vectors to RU.

Thus, the basis vectors as DFT vectors can be defined as:

$$U = [u_1 \; u_2 \; \cdots \; u_8] \qquad \text{Equation (7)}$$

$$u_k = \begin{bmatrix} 1 & e^{2\pi j \frac{k-1}{8}} & \cdots & e^{2\pi j \frac{7(k-1)}{8}} \end{bmatrix}^T$$

The basis vectors $u_k$ for a set of ortho-normal vectors. Since they are essentially DFT vectors, this can also be seen as a basis vectors of the beam-space. In this beam space each $P2_k$ can be written as:

$$P2_k = \sum_{l=1}^{8} \alpha_{k,l} u_l \qquad \text{Equation (8)}$$

$$\alpha_{k,l} = u_l^H \cdot P2_k$$

Since there are a total of 8 basis vectors, each P2k can be expressed as a linear combination of the 8 basis vectors. Hence, if the DU can compress the coefficients $\alpha_{k,l}$ for each $P2_k$.

In addition, the signaling between the DU and RU can be further compressed by choosing only 'M' values of $\alpha_{k,l}$ for each $P2_k$. Note, the above formulation is for precoder computation for CSI-RS transmission. For data traffic transmission, the DU can the same procedure, however the P2 is computed as $$P2 = V^H P1^{-1}, \qquad \text{Equation (9)}$$

where V is computed from the uplink channel estimate, P1 is the precoder matrix obtained from the CSI, and the same procedure is repeated for data traffic channel.

In one embodiment, described herein is a method comprising receiving an uplink reference signal associated with a channel. Based on a characteristic of the channel, the method can comprise generating a first precoder matrix, and in response to the generating the first precoder matrix, the method can comprise determining a channel coefficient associated with a linear combination of basis vectors associated with a wireless network device. In response to the determining the channel coefficient, the method can comprise transmitting the channel coefficient to a radio unit device. Furthermore, based on receiving channel state data from a mobile device and in response to the transmitting the channel coefficient to the radio unit device, the method can comprise generating a second precoder matrix. Additionally, in response to the generating the second precoder matrix, the method can comprise applying the second precoder matrix to a transmission, associated with the channel state data, and a demodulation reference signal associated with the mobile device.

According to another embodiment, a system can facilitate, generating a first precoder matrix in response to receiving an uplink reference signal associated with a channel and in response to the generating the first precoder matrix, the system can facilitate determining a channel coefficient associated with the first precoder matrix. In response to the determining the channel coefficient, the system can transmit the channel coefficient to a radio unit device. In response to the transmitting the channel coefficient to the radio unit device, the system can receive channel state data from a mobile device in communication with the radio unit device.

In response to the receiving the channel state data, the system can facilitate generating a second precoder matrix. Additionally, in response to the generating the second precoder matrix, the system can utilize the second precoder matrix for a transmission associated with the channel state data, and associated with a demodulation reference signal of the mobile device.

According to yet another embodiment, described herein is a machine-readable storage medium that can perform the operations comprising generating a first precoder matrix in response to receiving an uplink reference signal associated with a channel. Based on the first precoder matrix, the machine-readable storage medium can determine a channel coefficient associated with a linear combination. In response to facilitating transmitting the channel coefficient to a radio unit device, the machine-readable storage medium can facilitate receiving channel state data from a mobile device. Based on the channel state data, the machine-readable storage medium can generate a second precoder matrix. Furthermore, the machine-readable storage medium can apply the second precoder matrix to a transmission associated with the channel state data, and to a demodulation reference signal associated with the mobile device.

These and other embodiments or implementations are described in more detail below with reference to the drawings.

Referring now to FIG. 1, illustrated is an example wireless communication system 100 in accordance with various aspects and embodiments of the subject disclosure. In one or more embodiments, system 100 can comprise one or more user equipment UEs 102. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter), a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 gigahertz (Ghz) and 300 Ghz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

Figure 2:
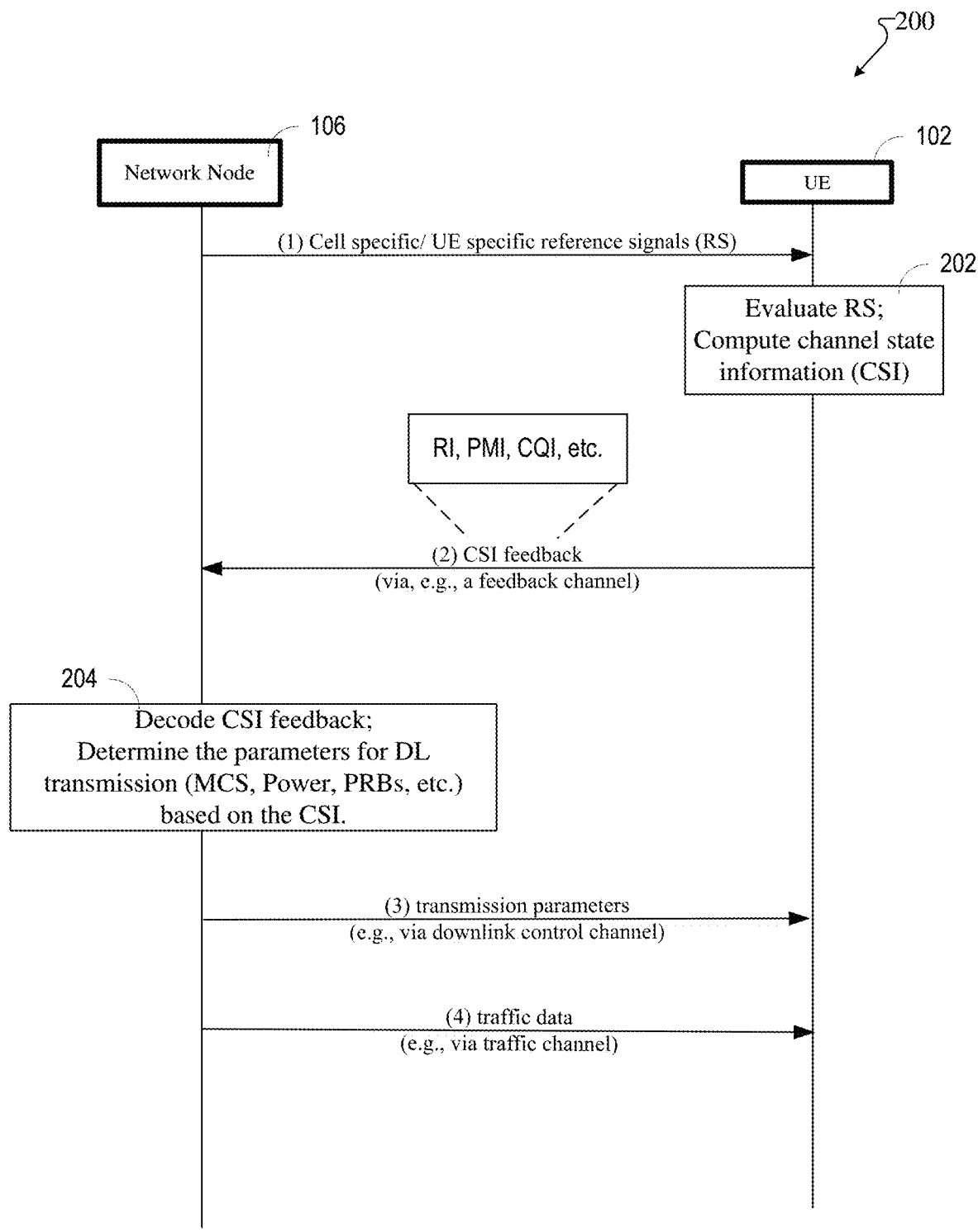
FIG. 2 illustrates an example schematic system block diagram of a message sequence chart between a network node and user equipment according to one or more embodiments.

FIG. 2 depicts a message sequence chart for downlink data transfer in 5G systems 200. The network node 106 can transmit reference signals to a user equipment (UE) 102. The reference signals can be cell specific and/or user equipment 102 specific in relation to a profile of the user equipment 102 or some type of mobile identifier. From the reference signals, the user equipment 102 can compute channel state information (CSI) and compute parameters needed for a CSI report at block 202. The CSI report can comprise: a channel quality indicator (CQI), a pre-coding matrix index (PMI), rank information (RI), a CSI-resource indicator (e.g., CRI the same as beam indicator), etc.

The user equipment 102 can then transmit the CSI report to the network node 106 via a feedback channel either on request from the network node 106, a-periodically, and/or periodically. A network scheduler can leverage the CSI report to determine downlink transmission scheduling parameters at 204, which are particular to the user equipment 102. The scheduling parameters 204 can comprise modulation and coding schemes (MCS), power, physical resource blocks (PRBs), etc. FIG. 2 depicts the physical layer signaling where the density change can be reported for the physical layer signaling or as a part of the radio resource control (RRC) signaling. In the physical layer, the density can be adjusted by the network node 106 and then sent over to the user equipment 102 as a part of the downlink control channel data. The network node 106 can transmit the scheduling parameters, comprising the adjusted densities, to the user equipment 102 via the downlink control channel. Thereafter and/or simultaneously, data can be transferred, via a data traffic channel, from the network node 106 to the user equipment 102.

Figure 3:
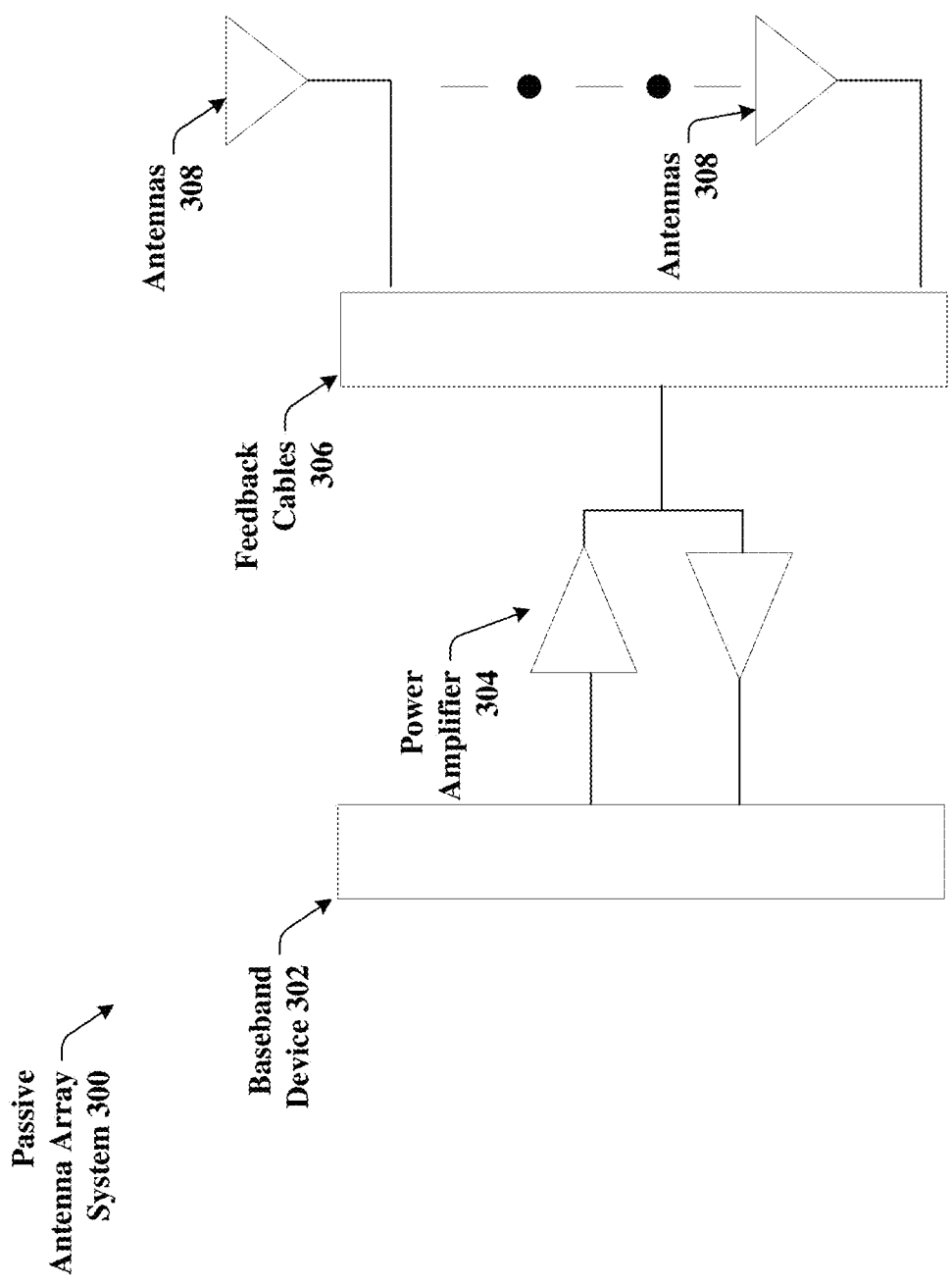
FIG. 3 illustrates an example schematic system block diagram of a passive antenna array according to one or more embodiments.

Referring now to FIG. 3, illustrated is an example schematic system block diagram of a passive antenna array according to one or more embodiments. FIG. 3 depicts an example of a passive antenna array system (AAS) 300 where baseband signals from a baseband device 302 can be boosted by a power amplifier 304 and connected to antennas 308 by longer feedback cables 306 that can comprise a power combiner, a power divider and/or a phase shifter. Consequently, in passive AAS, the baseband device 302 cannot control all of the radio components. However, active AASs, as depicted in FIG. 4, can reduce cable losses and energy consumption, increase performance, simplify installation and reduce equipment space.

Figure 4:
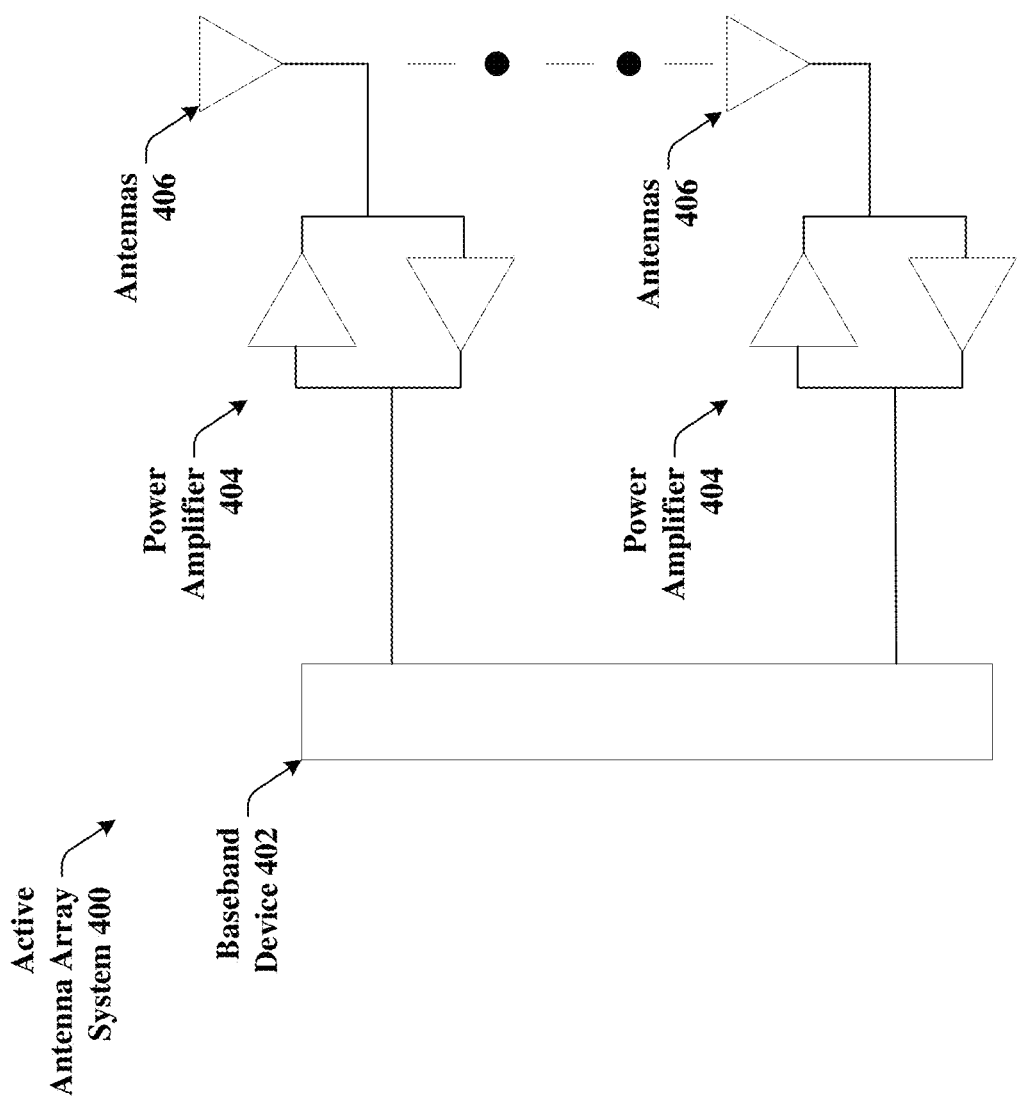
FIG. 4 illustrates an example schematic system block diagram of an active antenna array according to one or more embodiments.

Referring now to FIG. 4, illustrated is an example schematic system block diagram of an active antenna array according to one or more embodiments. FIG. 4 depicts an active array antenna system (AAS) 400, where radio frequency (RF) components such as power amplifiers 404 and transceivers can be integrated with an array of antennas 406. Active AASs 400 offer several benefits compared to traditional deployments with passive antennas connected to transceivers through feeder cables. Thus, the baseband device 402 can control all of the RF components.

Additionally, there are many applications of active AASs including, but not limited to: cell specific beamforming, user specific beamforming, vertical sectorization, massive MIMO, elevation beamforming, hybrid beamforming, etc. AASs can also be an enabler for further-advanced antenna concepts such as deploying several MIMO antenna elements at the gNB. For example, the gNB can be deployed with 32/64/128/256 antenna elements. When massive MIMO are deployed at the network side, to achieve beamforming/multiplexing gains, each RF component can be equal to that of antenna element. However, the cost for deploying RF circuitry for each antenna element can be reduced by using the concept of hybrid beamforming.

Figure 5:
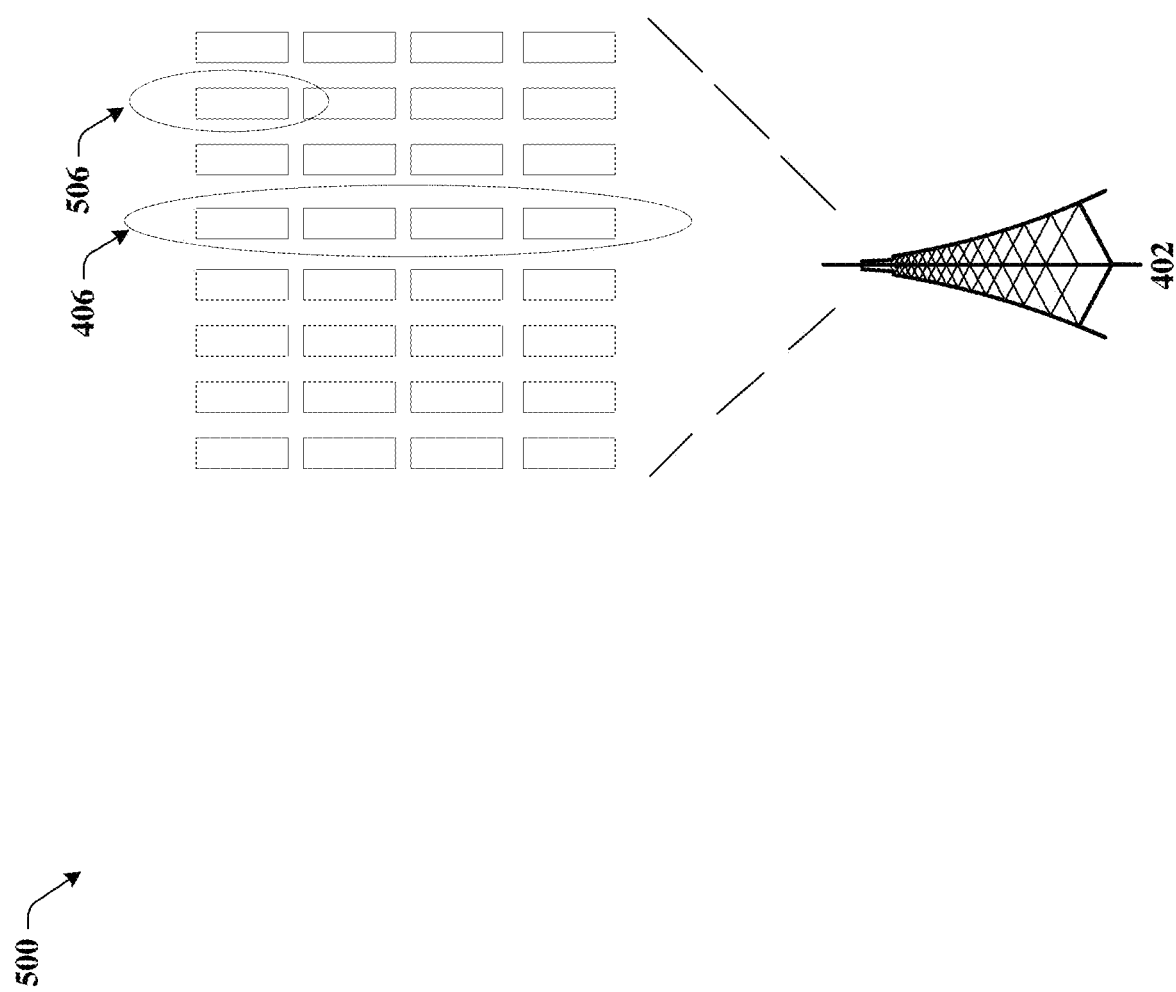
FIG. 5 illustrates an example schematic system block diagram of an antenna array for hybrid beamforming according to one or more embodiments.

Referring now to FIG. 5 illustrates an example schematic system block diagram of an antenna array for hybrid beamforming according to one or more embodiments. FIG. 5 depicts an example of hybrid beamforming using an active AAS 400. The system 500 can comprise a baseband device 402, and an array of antennas 406 comprising antenna elements 506. In hybrid forming, if the number of antenna elements 506 is equal to N, and the network uses Np ports (Np=2 or 4 or 8 or 16), then the signals transmitted from N elements can be virtualized from the Np antenna ports. Thus, the received signals for the $i^{th}$ subcarrier can be written as, $$Y=HFWx+n,\quad \text{Equation (10)}$$

where H is the channel matrix between the transmitter antenna elements of dimensions (Nr×N), F is the analog beamforming matrix of dimensions (N×$N_p$), W is the digital precoding matrix of dimensions ($N_p$×R), x is the transmitted signal vector of size (R×1), and R is the transmission rank of the system.

Figure 6:
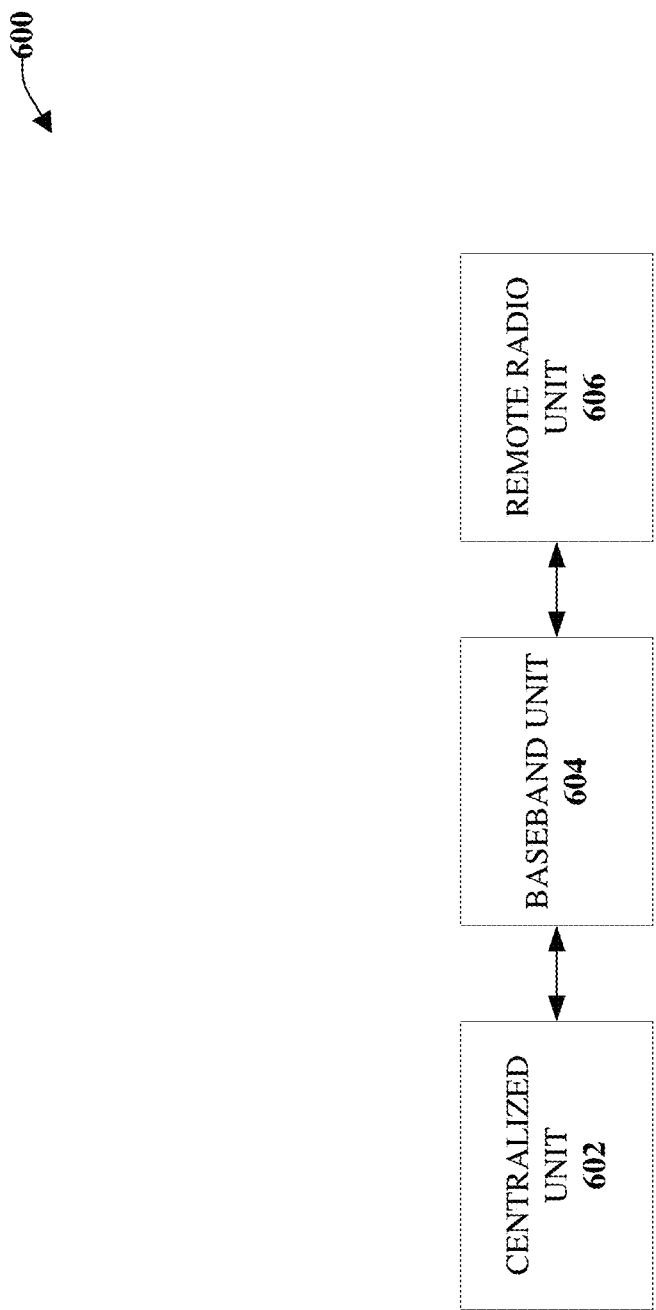
FIG. 6 illustrates an example schematic system block diagram of a cloud radio access network architecture according to one or more embodiments.

Referring now to FIG. 6, illustrated is an example schematic system block diagram of a cloud radio access network architecture 600 according to one or more embodiments. The cloud radio access networks (C-RAN) also called centralized RAN is a cellular architecture where the baseband digital units (DU) 604 can be centralized as a virtual resource pool and the remote radio units (RU) 606 can be located at places which are up to several miles away from DU and or centralized unite (CU) 602. FIG. 6 depicts the block diagram of the C-RAN. The link between DU and the RU is called a front haul.

In an embodiment, there can be a CU 602 that performs upper level Medium Access Control (MAC), a DU 604 that performs lower level MAC and physical layer functionality, and an RU 606 that can transmit and receive RF signals and convert analog signals to digital signals and vice versa. Each of the CU 602, DU 204, and RU 606 can be linked via a fiber optical network or other high bandwidth front haul network. To reduce complexity and bandwidth, the transmissions sent between the CU 602, DU 604, and RU 606 can be digital, so the RU 606 can receive analog signals and convert the analog RF signals to digital before transmitting to the DU 604. Similarly, the RU 606 can receive a digital transmission comprising the IQ data and beamforming coefficients and perform the digital beamforming, and digital to analog conversion at the RU 606.

The network node 104 can employ beamforming when transmitting to the UE 102. Beamforming is a signal processing technique used in sensor arrays for directional signal transmission or reception. This is achieved by combining elements in an antenna array in such a way that signals at particular angles experience constructive interference while others experience destructive interference.

Beamforming can be used at both the transmitting and receiving ends in order to achieve spatial selectivity. The improvement compared with omnidirectional reception/transmission is known as the directivity of the array. In the wireless communications context, a traffic-signaling system for cellular base stations that identifies the most efficient data-delivery route to a particular user, and it reduces interference for nearby users in the process. Depending on the situation and the technology, there are several ways to implement it in 5G networks.

Beamforming can help massive MIMO arrays, which are base stations arrayed with dozens or hundreds of individual antennas, to make more efficient use of the spectrum around them. The primary challenge for massive MIMO is to reduce interference while transmitting more information from many more antennas at once. At massive MIMO base stations, signal-processing algorithms plot the best transmission route through the air to each user. Then they can send individual data packets in many different directions, bouncing them off buildings and other objects in a precisely coordinated pattern. By choreographing the packets' movements and arrival time, beamforming allows many users and antennas on a massive MIMO array to exchange much more information at once. During beamforming, a data stream can be used to generate multiple data streams, each corresponding to an antenna port, and the data streams can each be modified based on a beamforming vector.

Frequency modulated IQ data can have "L" CSI-RS ports, where L is the number of layers associated with the data, and F tones before beamforming A=LxF matrix). After beamforming, the IQ data has P ports (each antenna) and F tones (B=PxF matrix). In digital beamforming, P2 is a PxL matrix where the rows of the matrix correspond to the number of ports, and columns correspond to the number of layers. This means that B=P2xA. In an embodiment of the disclosure then, the beamforming coefficients are compressed by adaptively quantizing each column of the beamforming matrix P2. Each column of P2 is quantized by $Q_1$ bits. $Q_1$ can be communicated to the RU at the same time.

Figure 7:
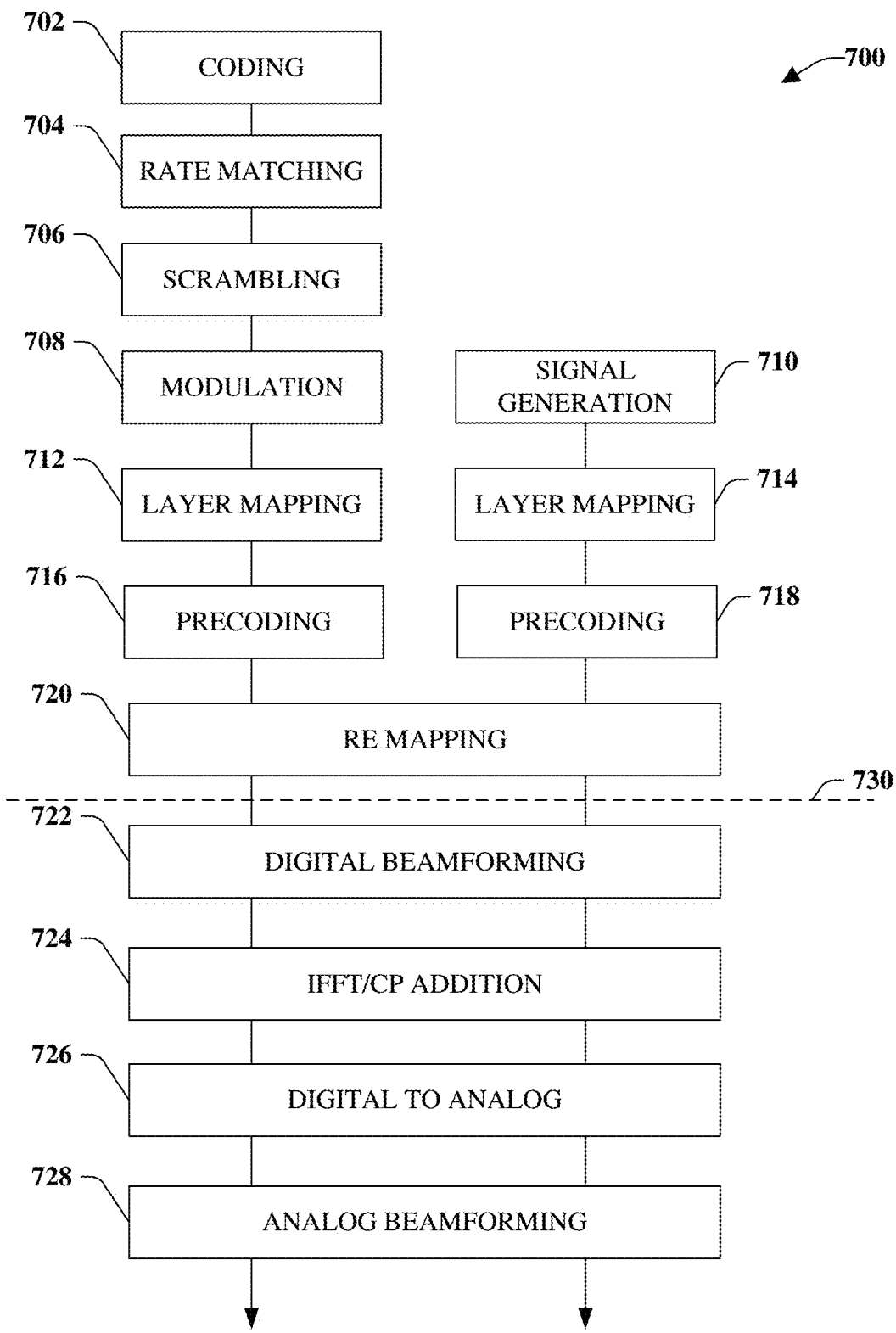
FIG. 7 illustrates an example schematic system block diagram of split options for fronthaul according to one or more embodiments.

Referring now to FIG. 7, illustrated is an example schematic system block diagram of split options for fronthaul 700 according to one or more embodiments. FIG. 7 depicts the precoding operation being performed at RU. However, the scheduler in the DU can control the precoder/beamforming weights at RU.

In an embodiment, various functionalities can be performed on data channel and control channels (e.g., PBCH) at the baseband unit device such as coding 702, rate matching 704, scrambling 706, and modulation 708, layer mapping 712 and precoding 716. The precoding 716 can be based on precoding matrix information as received from the user equipment device. Similarly, other functionalities related to cell specific signals (e.g., SS, CSI-RS, and UE specific signaling (e.g., DMRS) can be performed at the baseband unit as well, such as signal generation 710, layer mapping 714, and precoding 718. At 720, remapping, the baseband unit can calculate beamforming coefficients that can be used by the remote radio unit to perform beam weighting on the IQ data.

Demarcation line 730 can indicate the activities which above the line 730 are performed at the baseband unit 604, while the activities below the line 730 are performed at the remote radio unit 606.

Once the baseband unit 604 sends the beamforming coefficients to the remote radio unit 606, the remote radio unit 604 can perform digital beamforming 322, IFFT/CP addition 624, Digital to analog conversion 626, and then perform analog beamforming 628 before transmitting the data to the UE.

Figure 8:
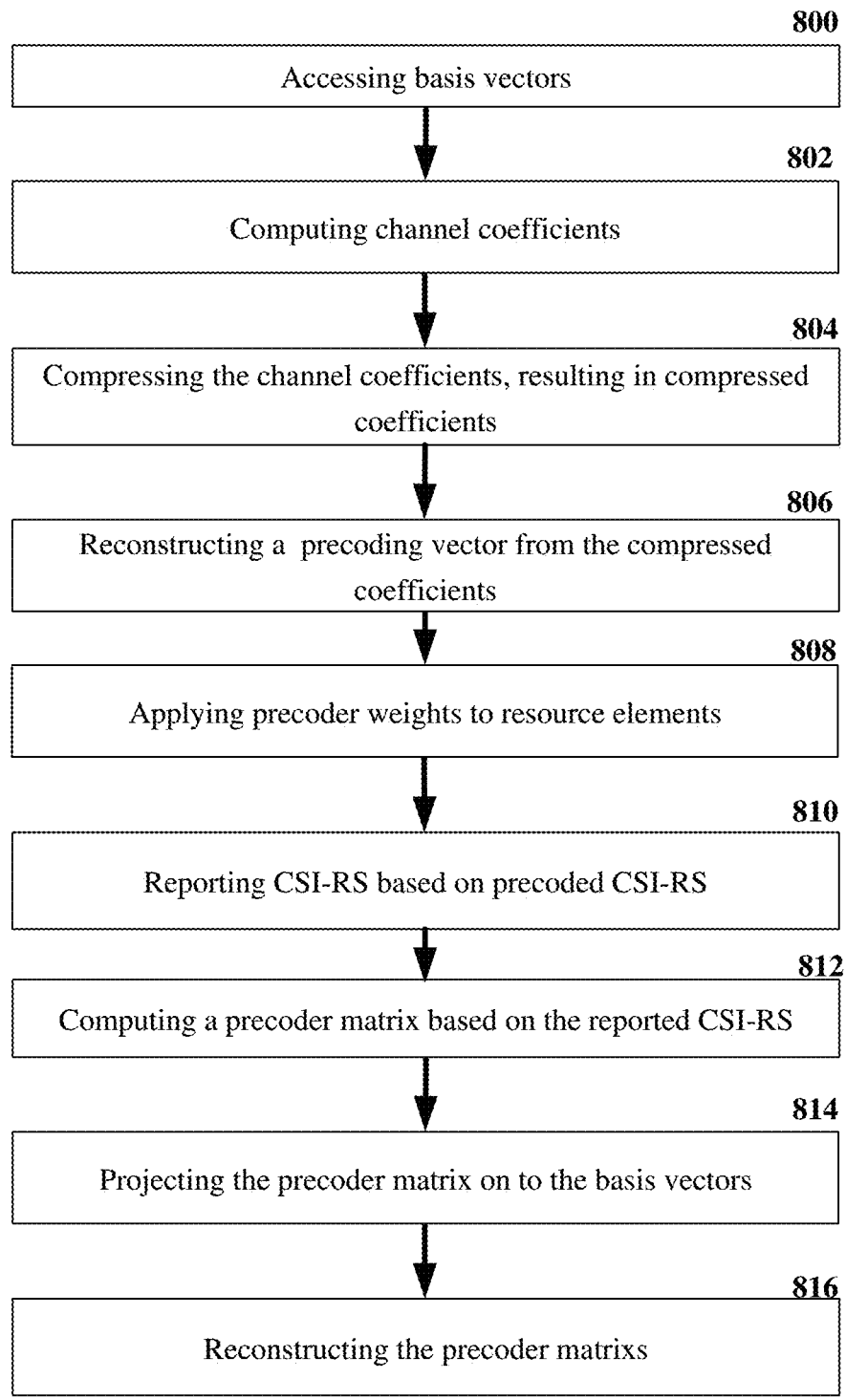
FIG. 8 illustrates an example flow diagram to obtain beamforming gains according to one or more embodiments.

Referring now to FIG. 8, illustrated is an example flow diagram to obtain beamforming gains according to one or more embodiments.

At element 800, the DU 604 and the RU 606 can both access basis vectors by a one time signaling and/or a periodic signaling. Based on the uplink reference signal, the DU 604 can then determine channel coefficients and the SVD of a channel associated with the uplink reference signal and project on to the basis vectors at element 802. At element 804, the DU 604 can compress the coefficients to reduce an overhead in the front haul, resulting in compressed coefficients. Next, at element 806, the RU 606 can reconstruct the precoder vector from the compressed coefficients (and the basis vectors) received from the DU 604. The RU 606 can then apply precoder weights to resource elements and transmit a precoded CSI-RS to the UE at element 808. At element 810, the UE can report the CSI-RS based on the precoded CSI-RS that it received. Based on the CSI-RS reported by the UE, at element 812, the DU 604 can generate a precoder matrix P2=(V$^H$)P1$^{-1}$, where V is computed from the uplink channel matrix H=UD V$^H$. After the precoder is found, the DU 604 can project the P2 on to the basis vectors and find the coefficients at element 814; and the DU 604 can compress the coefficients for a data traffic channel and transmit band transmit the compressed coefficients to the RU 606. At element 816, the RU 606 can reconstruct the precoder P2 and transmit the data applied to P2 to the data traffic channel.

Figure 9:
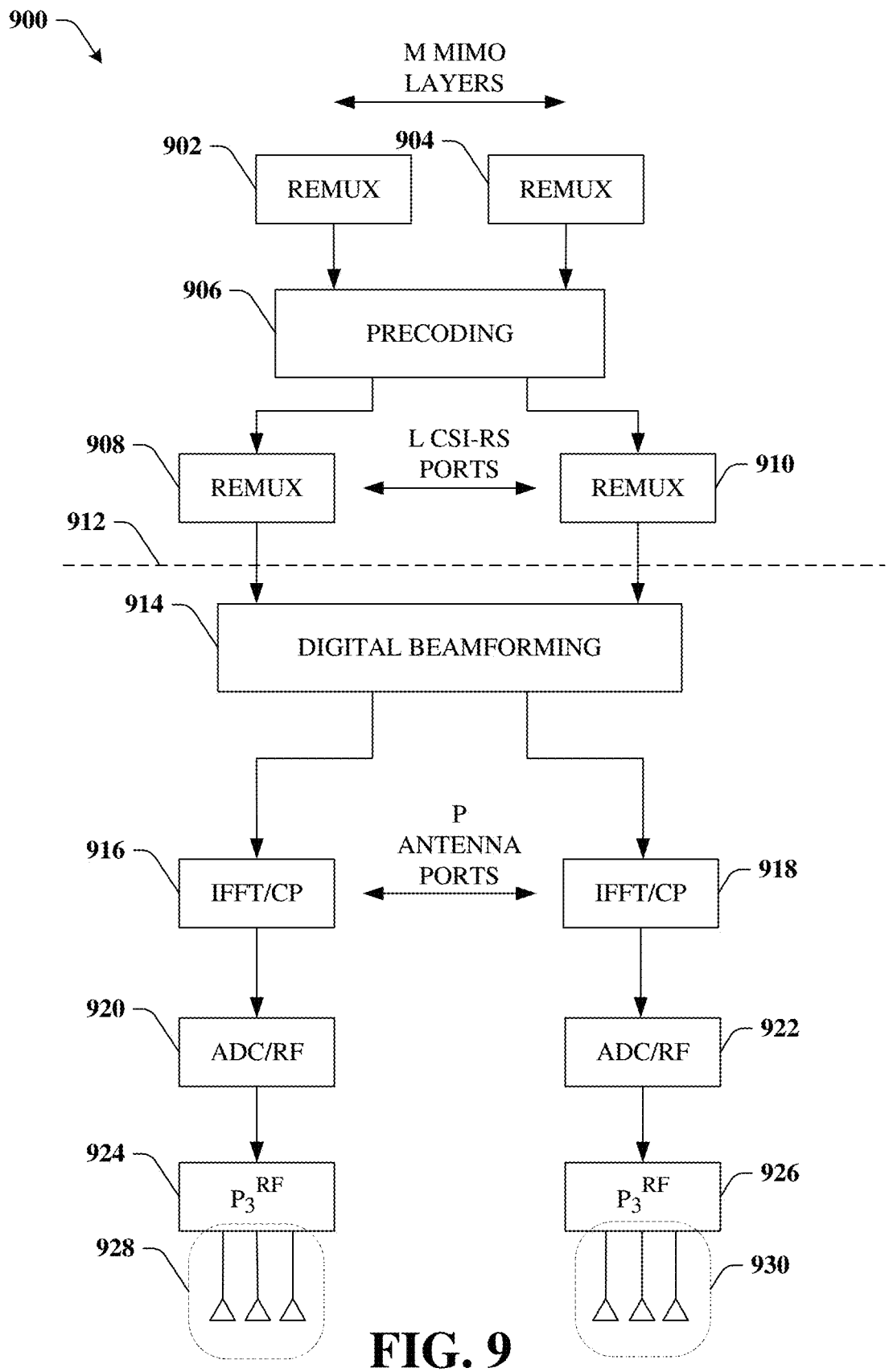
FIG. 9 illustrates an example schematic system block diagram of multi-stage representation of massive multiple-in multiple-out precoding according to one or more embodiments.

Referring now to FIG. 9, illustrates an example schematic system block diagram of multi-stage representation of massive multiple-in multiple-out precoding according to one or more embodiments. In flowchart 900, remultiplexing 902 and 904 can be performed on data streams corresponding to "M" MIMO layers, which can then go through precoding at 906. The output of the precoding 906 can be more remultiplexing 908 and 910 corresponding to L different CSI-RS ports (or layers). These L streams can then be digitally beamformed at 914 and split into data streams relating to P antenna ports. P can be much larger then L, so to reduce the overhead signaling, the digital beamforming 914 is performed at the remote radio unit, while other functionalities above the demarcation line 912 are performed at the baseband unit. IFFT/CP blocks 916 and 918 are applied to the P data streams, then analog to digital conversations 920 and 922 are applied before analog beamforming is performed to the P data streams at 924 and 926 and then the P data streams are transmitted via P antenna ports 928 and 930.

To perform the digital beamforming 914 at the remote radio unit, the remote radio unit receives the IQ data (frequency modulated data) along with the beamforming coefficients. The digital beamforming block uses the beamforming coefficients along with a basis vector matrix to perform the beamforming on each k$_t$h data stream corresponding to P antenna ports. Matrix inherently have low rank. A known codeword is sent between the DU and RU and send indices in the codebook to determine which column to look at and a multiplier for each column.

As described above, frequency modulated IQ data can have "L" CSI-RS ports, where L is the number of layers associated with the data, and F tones before beamforming A=LxF matrix). After beamforming, the IQ data has P ports (each antenna) and F tones (B=PxF matrix). In digital beamforming, P2 is a PxL matrix where the rows of the matrix correspond to the number of ports, and columns correspond to the number of layers. This means that B=P2xA. In an embodiment of the disclosure then, the beamforming coefficients are compressed by adaptively quantizing each column of the beamforming matrix P2. Each column of P2 is quantized by $Q_1$ bits. $Q_1$ is communicated to the RU at the same time.

Each column of P2 can be decomposed into a linear combination of certain basis vectors. The basis vectors can be the columns of a PxP orthonormal matrix. As an example, the size P Fourier matrix can be used. Each column of P2 denoted as P2$_l$ for l going from 1 to L can be denoted as $$P2_k = \sum_{k=1}^{P} \alpha_k e^{-i\theta_k} V_k \quad \text{Equation 11}$$

Where the set $\{V_k: k \in [1,2, \ldots P]\}$ is the set of basis vectors that is known to both the baseband unit and the remote radio unit. The baseband unit then decides to send a subset S of the basis coefficients and the basis vector index. In effect the baseband unit quantizes and sends $\{k, \hat{\alpha_k}, \hat{\theta_k}: k \in S\}$. For example, S can be $\{1, 2, 5\}$ or any subset of the set $\{1, 2, \ldots L\}$. The hat operator can denote quantization. The remote radio unit can then reconstruct the beamforming matrix using the following:

$$\hat{P2_k} = \sum_{k \in S} \hat{\alpha_k} e^{-i\hat{\theta_k}} V_k \quad \text{Equation 12}$$

The selection of the set S and the quantization can be decided by the baseband unit. In the least compressed version, the set S is the full set $\{1, 2, \ldots L\}$ and in that scenario the beamforming matrix is transmitted practically without any compression.

In Equation 1, the α and θ elements can be the beamforming coefficients, or the modifiers that weight the already known V, which is the basis vector/matrix that is known to both the DU 604 and the RU 606. $V_k$ is the k$^{th}$ column of the basis matrix. So, for each antenna port P there is a set of beamforming coefficients α and θ that are used, in conjunction with the corresponding basis vector, to digitally beamform the data stream that corresponds to the port. These beamforming coefficients, a set of α and θ for each kth value, are sent along with the data to the remote radio unit.

Figure 10:
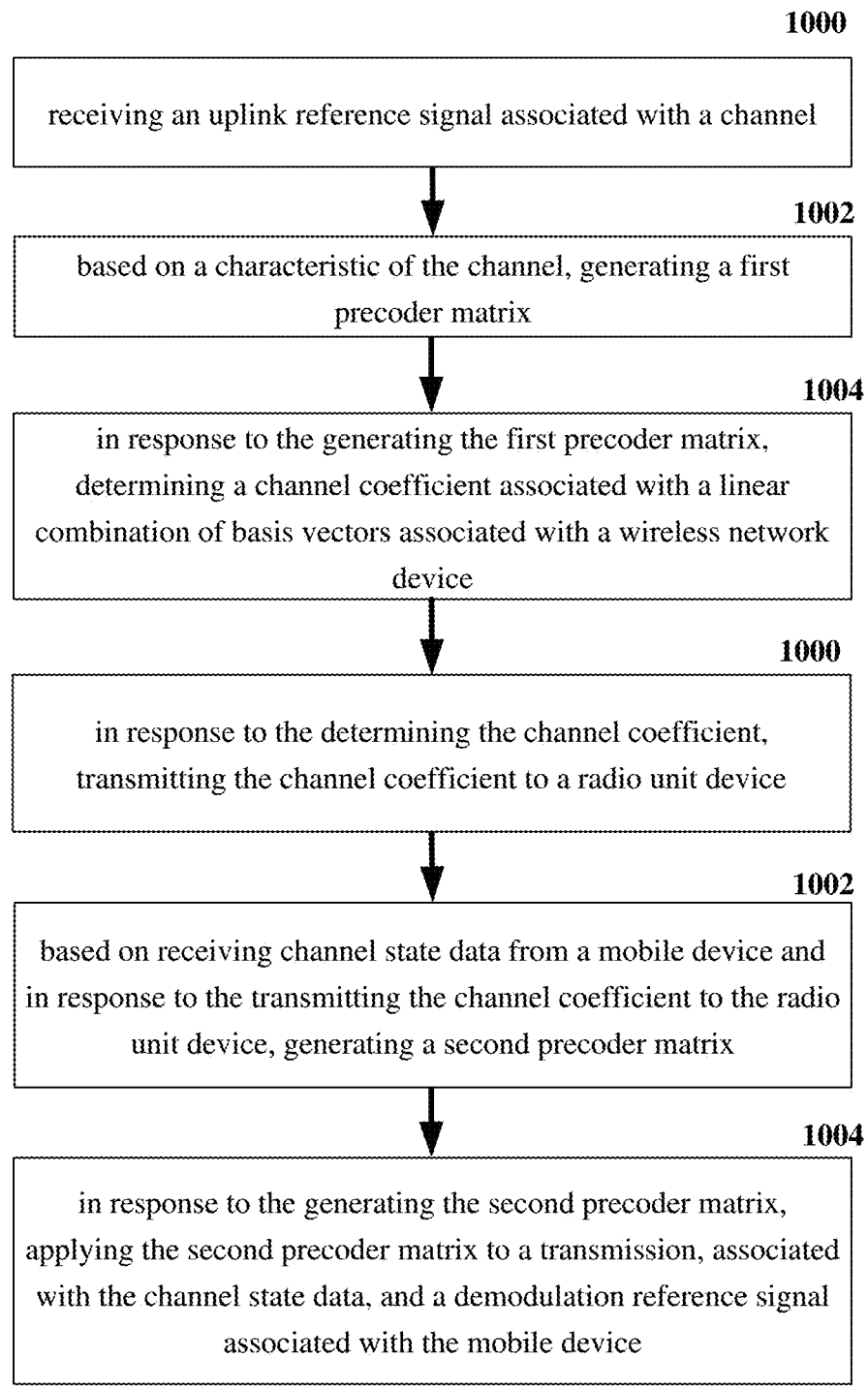
FIG. 10 illustrates an example flow diagram for a method for facilitating beamforming gains for a 5G network according to one or more embodiments.

Referring now to FIG. 10, illustrated is an example flow diagram for an example method for facilitating beamforming gains for a 5G network according to one or more embodiments. At element 1000, a wireless network device (e.g., DU 604) can receive an uplink reference signal associated with a channel. Based on a characteristic of the channel, the wireless network device (e.g., DU 604) can generate a first precoder matrix at element 1002, and in response to the generating the first precoder matrix, the wireless network device (e.g., DU 604) can determine a channel coefficient associated with a linear combination of basis vectors associated with the wireless network device at element 1004. In response to the determining the channel coefficient, the wireless network device (e.g., DU 604) can transmit the channel coefficient to a radio unit device (e.g., RU 606) at element 1006. Furthermore, based on receiving channel state data from a mobile device and in response to the transmitting the channel coefficient to the radio unit device, the wireless network device (e.g., DU 604) can generate a second precoder matrix at element 1008. Additionally, in response to generating the second precoder matrix, the wireless network device (e.g., DU 604) can apply the second precoder matrix to a transmission, associated with the channel state data, and a demodulation reference signal associated with the mobile device 104 at element 1010.

Figure 11:
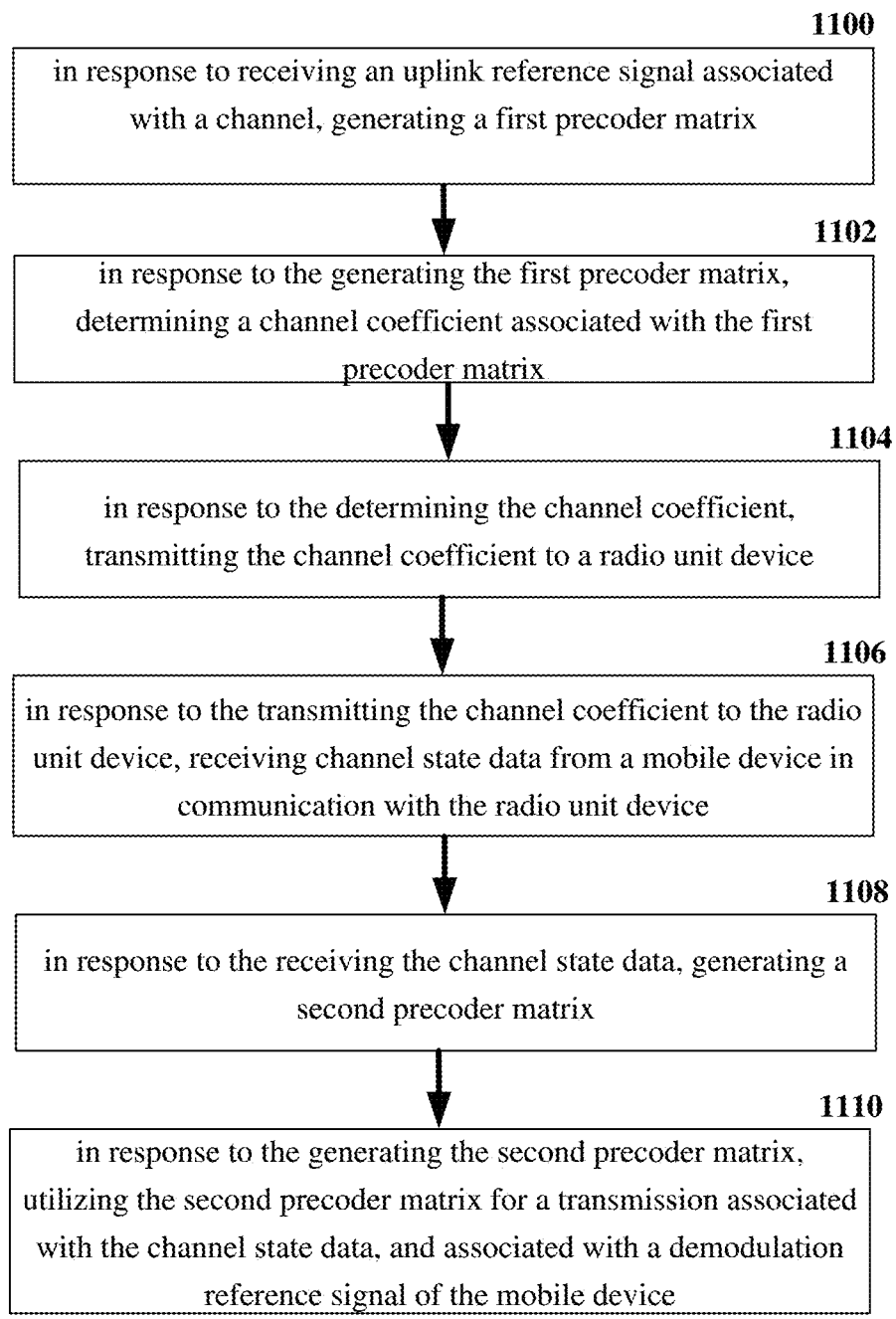
FIG. 11 illustrates an example flow diagram for a system for facilitating beamforming gains for a 5G network according to one or more embodiments.

Referring now to FIG. 11, illustrated is an example flow diagram for a system for facilitating beamforming gains for a 5G network according to one or more embodiments. At element 1100, a system can facilitate, generating a first precoder matrix in response to receiving (e.g., via DU 604) an uplink reference signal associated with a channel and in response to the generating (e.g., via DU 604) the first precoder matrix, the system can facilitate determining (e.g., via DU 604) a channel coefficient associated with the first precoder matrix at element 1102. In response to the determining the channel coefficient, the system can transmit (e.g., via DU 604) the channel coefficient to a radio unit device 606 at element 1104, and in response to the transmitting the channel coefficient to the radio unit, they system can receive channel state data from a mobile device 104 in communication with the radio unit device 606 at element 1106. At element 1108, in response to the receiving (e.g., via DU 604) the channel state data, the system can facilitate generating (e.g., via DU 604) a second precoder matrix. Additionally, in response to the generating the second precoder matrix, the system can utilize (e.g., via DU 604) the second precoder matrix for a transmission associated with the channel state data at element 1110, and associated with a demodulation reference signal of the mobile device.

Figure 12:
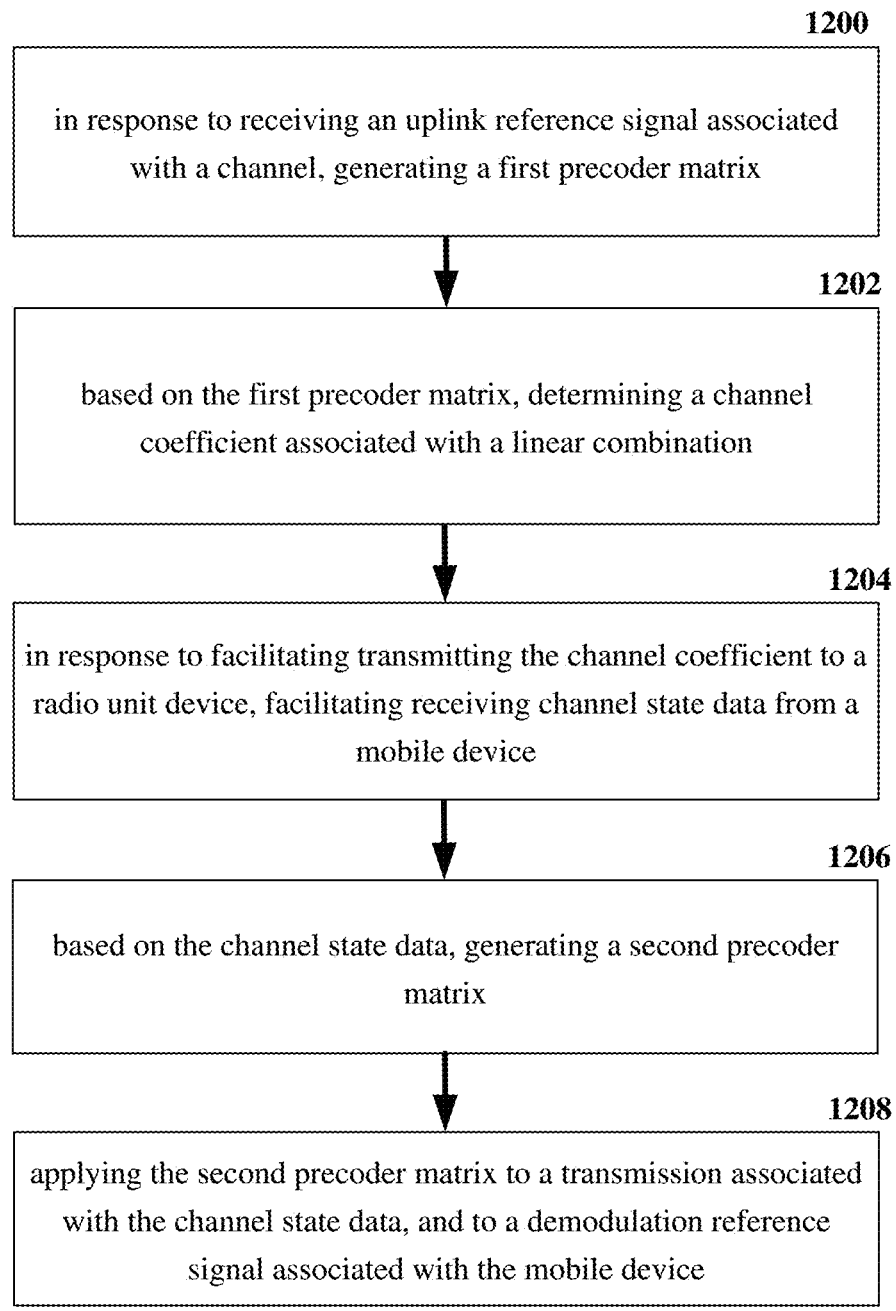
FIG. 12 illustrates an example flow diagram for a computer-readable medium for facilitating beamforming gains for a 5G network according to one or more embodiments.

Referring now to FIG. 12, illustrated is an example flow diagram for a computer-readable medium for facilitating beamforming gains for a 5G network according to one or more embodiments. At element 1200, a machine-readable storage medium can perform operations comprising generating (e.g., via DU 604) a first precoder matrix in response to receiving an uplink reference signal associated with a channel. Based on the first precoder matrix, at element 1202, a channel coefficient associated with a linear combination can be determined (e.g., via DU 604). In response to facilitating transmitting (e.g., via DU 604) the channel coefficient to a radio unit device, the machine-readable storage medium can facilitate receiving (e.g., via DU 604) channel state data from a mobile device 104. Based on the channel state data, a second precoder matrix can be generated (e.g., via DU 604). Thus, the second precoder matrix can be applied (e.g., via DU 604) to a transmission associated with the channel state data, and to a demodulation reference signal associated with the mobile device.

Figure 13:
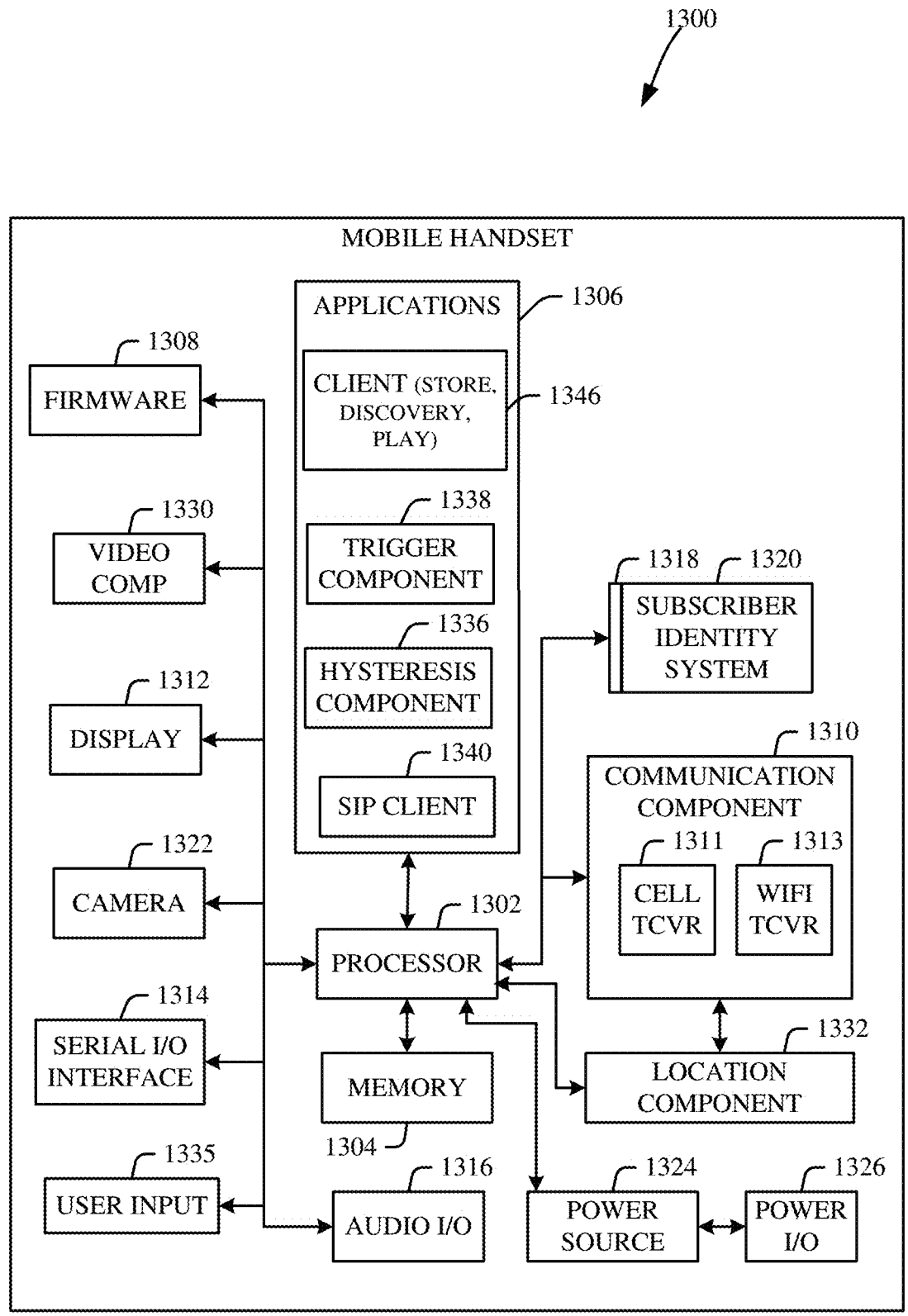
FIG. 13 illustrates an example block diagram of an example mobile handset operable to engage in a system architecture that facilitates secure wireless communication according to one or more embodiments described herein.

Referring now to FIG. 13, illustrated is an example block diagram of an example mobile handset 1300 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 1302 for controlling and processing all onboard operations and functions. A memory 1304 interfaces to the processor 1302 for storage of data and one or more applications 1306 (e.g., a video player software, user feedback component software, etc.). Other applications can include voice recognition of predetermined voice commands that facilitate initiation of the user feedback signals.

The applications 1306 can be stored in the memory 1304 and/or in a firmware 1308, and executed by the processor 1302 from either or both the memory 1304 or/and the firmware 1308. The firmware 1308 can also store startup code for execution in initializing the handset 1300. A communications component 1310 interfaces to the processor 1302 to facilitate wired/wireless communication with external systems, e.g., cellular networks, VoIP networks, and so on. Here, the communications component 1310 can also include a suitable cellular transceiver 1311 (e.g., a GSM transceiver) and/or an unlicensed transceiver 1313 (e.g., Wi-Fi, WiMax) for corresponding signal communications. The handset 1300 can be a device such as a cellular telephone, a PDA with mobile communications capabilities, and messaging-centric devices. The communications component 1310 also facilitates communications reception from terrestrial radio networks (e.g., broadcast), digital satellite radio networks, and Internet-based radio services networks The handset 1300 includes a display 1312 for displaying text, images, video, telephony functions (e.g., a Caller ID function), setup functions, and for user input. For example, the display 1312 can also be referred to as a "screen" that can accommodate the presentation of multimedia content (e.g., music metadata, messages, wallpaper, graphics, etc.). The display 1312 can also display videos and can facilitate the generation, editing and sharing of video quotes. A serial I/O interface 1314 is provided in communication with the processor 1302 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1300, for example. Audio capabilities are provided with an audio I/O component 1316, which can include a speaker for the output of audio signals related to, for example, indication that the user pressed the proper key or key combination to initiate the user feedback signal. The audio I/O component 1316 also facilitates the input of audio signals through a microphone to record data and/or telephony voice data, and for inputting voice signals for telephone conversations.

The handset 1300 can include a slot interface 1318 for accommodating a SIC (Subscriber Identity Component) in the form factor of a card Subscriber Identity Module (SIM) or universal SIM 1320, and interfacing the SIM card 1320 with the processor 1302. However, it is to be appreciated that the SIM card 1320 can be manufactured into the handset 1300, and updated by downloading data and software.

The handset 1300 can process IP data traffic through the communications component 1310 to accommodate IP traffic from an IP network such as, for example, the Internet, a corporate intranet, a home network, a person area network, etc., through an ISP or broadband cable provider. Thus, VoIP traffic can be utilized by the handset 1300 and IP-based multimedia content can be received in either an encoded or a decoded format.

A video processing component 1322 (e.g., a camera) can be provided for decoding encoded multimedia content. The video processing component 1322 can aid in facilitating the generation, editing, and sharing of video quotes. The handset 1300 also includes a power source 1324 in the form of batteries and/or an AC power subsystem, which power source 1324 can interface to an external power system or charging equipment (not shown) by a power I/O component 1326.

The handset 1300 can also include a video component 1330 for processing video content received and, for recording and transmitting video content. For example, the video component 1330 can facilitate the generation, editing and sharing of video quotes. A location tracking component 1332 facilitates geographically locating the handset 1300. As described hereinabove, this can occur when the user initiates the feedback signal automatically or manually. A user input component 1334 facilitates the user initiating the quality feedback signal. The user input component 1334 can also facilitate the generation, editing and sharing of video quotes. The user input component 1334 can include such conventional input device technologies such as a keypad, keyboard, mouse, stylus pen, and/or touch screen, for example.

Referring again to the applications 1306, a hysteresis component 1336 facilitates the analysis and processing of hysteresis data, which is utilized to determine when to associate with the access point. A software trigger component 1338 can be provided that facilitates triggering of the hysteresis component 1336 when the Wi-Fi transceiver 1313 detects the beacon of the access point. A SIP client 1340 enables the handset 1300 to support SIP protocols and register the subscriber with the SIP registrar server. The applications 1306 can also include a client 1342 that provides at least the capability of discovery, play and store of multimedia content, for example, music.

The handset 1300, as indicated above related to the communications component 1310, includes an indoor network radio transceiver 1313 (e.g., Wi-Fi transceiver). This function supports the indoor radio link, such as IEEE 802.11, for the dual-mode GSM handset 1300. The handset 1300 can accommodate at least satellite radio services through a handset that can combine wireless voice and digital radio chipsets into a single handheld device.

Figure 14:
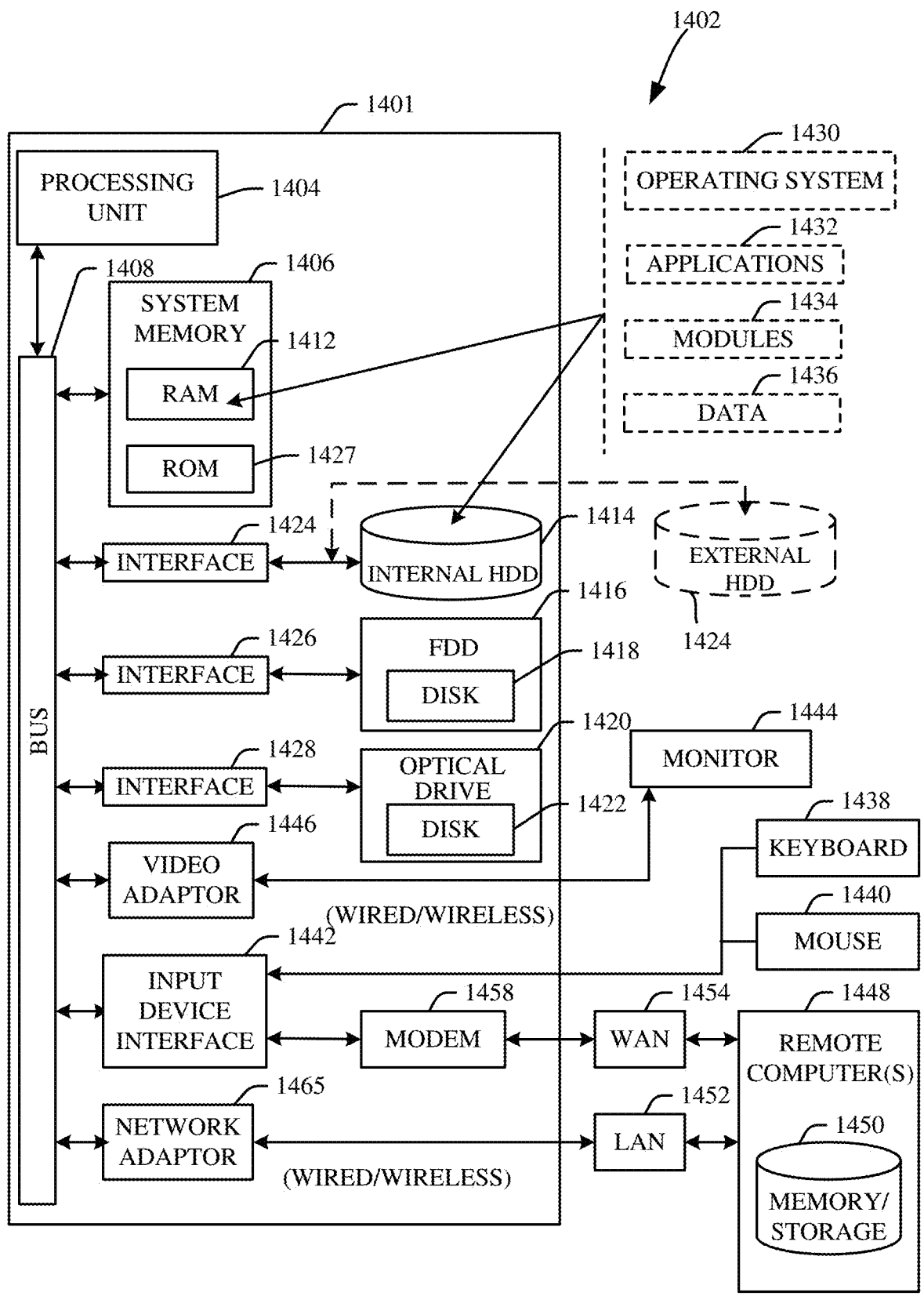
FIG. 14 illustrates an example block diagram of an example computer operable to engage in a system architecture that facilitates secure wireless communication according to one or more embodiments described herein.

Referring now to FIG. 14, illustrated is an example block diagram of an example computer 1400 operable to engage in a system architecture that facilitates wireless communications according to one or more embodiments described herein. The computer 1400 can provide networking and communication capabilities between a wired or wireless communication network and a server (e.g., Microsoft server) and/or communication device. In order to provide additional context for various aspects thereof, FIG. 14 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The techniques described herein can be applied to any device or set of devices (machines) capable of running programs and processes. It can be understood, therefore, that servers including physical and/or virtual machines, personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below with reference to FIG. 14 is but one example of a computing device.

In order to provide a context for the various aspects of the disclosed subject matter, FIG. 14 and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1420 (see below), non-volatile memory 1422 (see below), disk storage 1424 (see below), and memory storage 1446 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 14 illustrates a block diagram of a computing system 1400 operable to execute the disclosed systems and methods in accordance with an embodiment. Computer 1412, which can be, for example, part of the hardware of system 1420, includes a processing unit 1414, a system memory 1416, and a system bus 1418. System bus 1418 couples system components including, but not limited to, system memory 1416 to processing unit 1414. Processing unit 1414 can be any of various available processors. Dual microprocessors and other multiprocessor architectures also can be employed as processing unit 1414.

System bus 1418 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PC-MCIA), Firewire (IEEE 1494), and Small Computer Systems Interface (SCSI).

System memory 1416 can include volatile memory 1420 and nonvolatile memory 01422. A basic input/output system (BIOS), containing routines to transfer information between elements within computer 1412, such as during start-up, can be stored in nonvolatile memory 1422. By way of illustration, and not limitation, nonvolatile memory 1422 can include ROM, PROM, EPROM, EEPROM, or flash memory. Volatile memory 1420 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1412 can also include removable/non-removable, volatile/non-volatile computer storage media. FIG. 14 illustrates, for example, disk storage 1424. Disk storage 1424 includes, but is not limited to, devices like a magnetic disk drive, floppy disk drive, tape drive, flash memory card, or memory stick. In addition, disk storage 1424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1424 to system bus 1418, a removable or non-removable interface is typically used, such as interface 1426.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 14 describes software that acts as an intermediary between users and computer resources described in suitable operating environment 1400. Such software includes an operating system 1428. Operating system 1428, which can be stored on disk storage 1424, acts to control and allocate resources of computer system 1412. System applications 1430 take advantage of the management of resources by operating system 1428 through program modules 1432 and program data 1434 stored either in system memory 1416 or on disk storage 1424. It is to be noted that the disclosed subject matter can be implemented with various operating systems or combinations of operating systems.

A user can enter commands or information into computer 1412 through input device(s) 1436. As an example, a mobile device and/or portable device can include a user interface embodied in a touch sensitive display panel allowing a user to interact with computer 1412. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1414 through system bus 1418 by way of interface port(s) 1438. Interface port(s) 1438 include, for example, a serial port, a parallel port, a game port, a universal serial bus (USB), an infrared port, a Bluetooth port, an IP port, or a logical port associated with a wireless service, etc. Output device(s) 1440 and a move use some of the same type of ports as input device(s) 1436.

Thus, for example, a USB port can be used to provide input to computer 1412 and to output information from computer 1412 to an output device 1440. Output adapter 1442 is provided to illustrate that there are some output devices 1440 like monitors, speakers, and printers, among other output devices 1440, which use special adapters. Output adapters 1442 include, by way of illustration and not limitation, video and sound cards that provide means of connection between output device 1440 and system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. Remote computer(s) 1444 can be a personal computer, a server, a router, a network PC, cloud storage, cloud service, a workstation, a microprocessor based appliance, a peer device, or other common network node and the like, and typically includes many or all of the elements described relative to computer 1412.

For purposes of brevity, only a memory storage device 1446 is illustrated with remote computer(s) 1444. Remote computer(s) 1444 is logically connected to computer 1412 through a network interface 1448 and then physically connected by way of communication connection 1450. Network interface 1448 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1450 refer(s) to hardware/software employed to connect network interface 1448 to bus 1418. While communication connection 1450 is shown for illustrative clarity inside computer 1412, it can also be external to computer 1412. The hardware/software for connection to network interface 1448 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A system, comprising:
    a processor; and
    a non-transitory memory that stores executable instructions that, when executed by the processor, facilitate performance of operations, comprising:
        sending channel coefficient data representative of a channel coefficient to a first device, wherein the channel coefficient is based on a first precoder matrix generated based on a characteristic of a channel, and wherein an uplink reference signal was received via the channel; and
        sending a transmission to a second device, wherein the transmission is based on a second precoder matrix generated based on channel state data received from the second device in response to the sending the channel coefficient data to the first device, and based on a demodulation reference signal associated with the second device.

2. The system of claim 1, wherein the operations further comprise:
    compressing the channel coefficient data resulting in compressed channel coefficient data; and
    reducing a payload associated with front haul communications between a network device and the first device based on the compressed channel coefficient data.

3. The system of claim 2, wherein the operations further comprise:
    transmitting the compressed channel coefficient data to the first device; and
    reducing a cost associated with the front haul communications between the network device and the first device based on the compressed channel coefficient data.

4. The system of claim 1, wherein the channel coefficient is a first channel coefficient, and wherein the operations further comprise:

compressing second channel coefficient data representative of a second channel coefficient associated with the second precoder matrix.

5. The system of claim 1, wherein the operations further comprise:
projecting the second precoder matrix onto a basis vector accessible to a network device.

6. The system of claim 1, wherein the operations further comprise:
prior to the sending the channel coefficient data, determining the channel coefficient associated with a linear combination of basis vectors associated with a network device.

7. The system of claim 1, wherein the channel coefficient is associated with a basis vector of a group of basis vectors accessible to the second device.

8. The system of claim 1, wherein the operations further comprise:
receiving the channel state data from the second device.

9. The system of claim 1, wherein the first device and the second device are communicatively coupled.

10. The system of claim 1, wherein the first device is a radio unit device and the second device is a user equipment device.

11. A method, comprising:
generating, by a device comprising a processor, a first precoder matrix based on a characteristic of a channel over which an uplink signal was received;
determining, by the device, a channel coefficient associated with a linear combination of basis vectors associated with a network device and based on the first precoder matrix;
generating, by the device, a second precoder matrix based on channel state data received from a user equipment device in response to a first transmission of the channel coefficient to a radio unit device; and
applying, by the device, the second precoder matrix to a second transmission and a demodulation reference signal.

12. The method of claim 11, wherein the second transmission is associated with the channel state data, and wherein the demodulation reference signal is associated with the user equipment device.

13. The method of claim 11, further comprising:
reducing, by the device, a size of a communication associated with a front haul between the network device and the radio unit device.

14. The method of claim 11, wherein the channel coefficient is a first channel coefficient, and wherein the method further comprises:
prior to the applying the second precoder matrix, compressing, by the device, a second channel coefficient associated with the second precoder matrix.

15. The method of claim 11, further comprising:
applying, by the device, the second precoder matrix to a basis vector stored by the network device.

16. The method of claim 11, further comprising:
projecting, by the device, the second precoder matrix onto a basis vector accessible to the network device.

17. A non-transitory machine-readable medium, comprising executable instructions that, when executed by a processor, facilitate performance of operations, comprising:
facilitating a first transmission of a channel coefficient to a first device, wherein the channel coefficient is based on a first precoder matrix generated based on a characteristic of a channel, and wherein an uplink reference signal was received via the channel; and
facilitating a second transmission to a second device, wherein the second transmission is based on a second precoder matrix generated based on channel state data received from the second device in response to the facilitating the first transmission of the channel coefficient to the first device, and based on a demodulation reference signal associated with the second device.

18. The non-transitory machine-readable medium of claim 17, wherein the channel coefficient is associated with a basis vector of a group of basis vectors accessible to the second device.

19. The non-transitory machine-readable medium of claim 17, wherein the operations further comprise:
prior to the facilitating the second transmission, determining the channel coefficient associated with a linear combination of basis vectors associated with a network device.

20. The non-transitory machine-readable medium of claim 17, wherein the operations further comprise:
reducing a size of a communication associated with a front haul between a network device and the first device.

* * * * *